H. C. McCURRIE.
ANIMAL TRAP.
APPLICATION FILED NOV. 3, 1920.
1,400,175.
Patented Dec. 13, 1921.
2 SHEETS—SHEET 1.
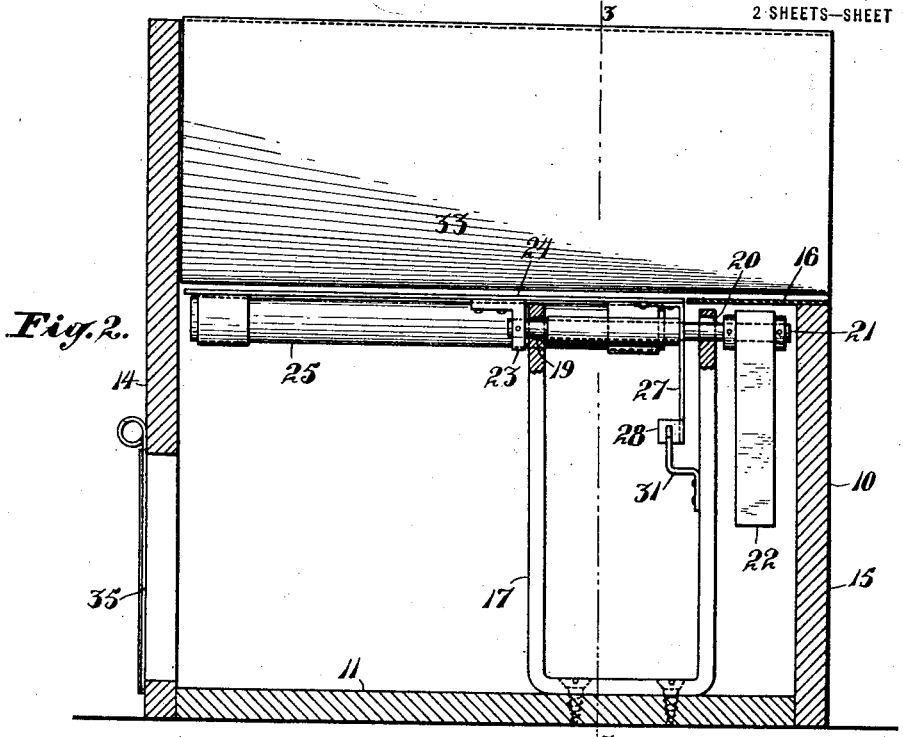
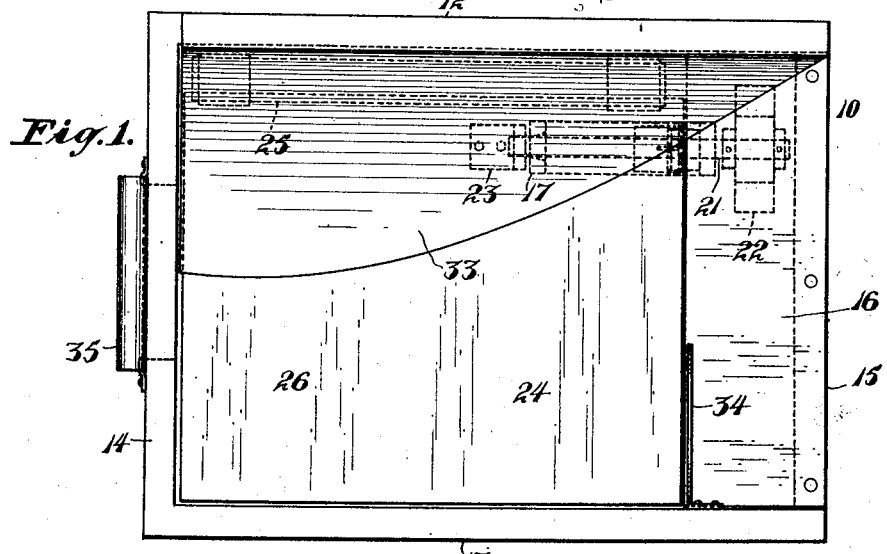
INVENTOR.
Hugh C. McCurrie
BY Chas. E. Townsend
ATTORNEY

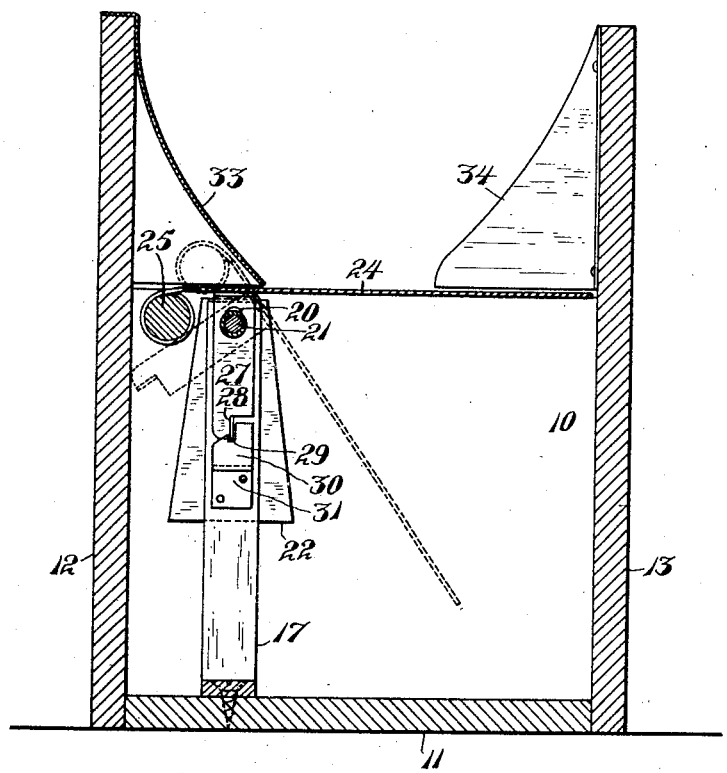

UNITED STATES PATENT OFFICE.

HUGH C. McCURRIE, OF SAN FRANCISCO, CALIFORNIA.

ANIMAL-TRAP.

1,400,175.  Specification of Letters Patent.  Patented Dec. 13, 1921.

Application filed November 3, 1920. Serial No. 421,445.

*To all whom it may concern:*

Be it known that I, HUGH C. McCURRIE, a citizen of the United States, residing at San Francisco, in the county of San Francisco and State of California, have invented new and useful Improvements in Animal-Traps, of which the following is a specification.

This invention relates to an animal trap and more particularly to a device for trapping rodents or small animals such as rats, mice, squirrels or the like.

The object of the invention is to provide a trap of the type above characterized which will automatically reset itself after being tripped, and thus enable a number of rodents or other small animals to be trapped without any attention being given to the trap.

Other objects relating to details of construction will later appear in the description to follow.

In carrying out the invention a platform is provided which forms the top of an inclosure, and the platform is so mounted that it is permitted to tilt both longitudinally and transversely. Locking means are also connected with the platform to hold it against transverse tilting movement until it has been tilted longitudinally and in this manner a rodent or other animal will not be expelled into the inclosure over which the platform extends until such rodent or animal is fully disposed upon the platform.

The invention is illustrated by way of example in the accompanying drawings in which—

Figure 1 is a top plan view of a practical embodiment of the invention.

Fig. 2 is a vertical, central, longitudinal section of Fig. 1.

Fig. 3 is a transverse vertical section taken on the line 3—3 of Fig. 2, and also showing the platform in its transverse tilted position.

Referring to the drawings more particularly, 10 indicates generally an open top box structure which may be of any desired shape or size and made of any material. The box in this instance is rectangular in shape and comprises a bottom 11, side walls 12 and 13 and end walls 14 and 15. The end wall 15 is partly cut away, as shown in Fig. 2, and upon the upper end thereof is secured an extension plate 16, said plate extending inwardly as shown and approximately equal in width to the box.

To the bottom of the box there is secured a U-shaped member 17 by means of screws or the like as shown. Adjacent the terminal ends of this member there is formed a pair of alined openings 19 and 20 adapted to journal a shaft 21. The opening 20 is enlarged with respect to the diameter of the end of the shaft 21 which it journals, while the opening 19 is likewise enlarged and preferably made conical in shape as shown. The object of this particular construction or journaling of the shaft 19 will later become evident. On one end of the shaft 21 there is positioned a weight 22, said weight being journaled as shown and free to turn upon the shaft. The other end of the shaft has an L-shaped member 23 rigidly secured thereto which on its free end supports a platform 24, the platform being secured slightly to one side of its longitudinal center and near its one side edge as shown in Fig. 1. The platform is of such a length so that it is free to move between the extension plate 16 and the end wall 14 of the box. Also its edge adjacent the side wall 13 of the box is disposed so that the platform will be free to swing upward and downward with the rotation of the shaft 21. The other side edge of the platform is spaced with relation to the adjacent wall 12 of the box to permit a weight 25 to be secured thereto and swing upward and downward without interference with the wall 12. The weight is preferably disposed along the entire side edge of the platform as shown, and adapted to counterbalance the portion 26 of the platform which is disposed on the opposite side of the shaft 21. Likewise the weight 22 is adapted to counterbalance the excess portion of the platform beyond the support 23 from said weight.

From the description now given it is evident that if a rodent or other small animal were to tread upon the portion 26 of the platform at any point the platform would tilt transversely. However, as before stated it is the purpose of the invention to hold the platform from tilting in this manner until the rodent or other animal is entirely upon the platform. This is accomplished by providing a finger 27 which depends from the platform from a point intermediate the weight 25 and the shaft 21. The finger has formed on its lower end a thin plate like member 28 which extends at right angles to the finger and this plate engages in a notch 29 formed in the top edge of a plate 30, said last named plate being formed integral and supported by a bracket arm 31 which is secured to the adjacent arm of the U-shaped member 17. In forming the notch 29 a central slot is formed longitudinally of the plate 30 in the upper end thereof and at a point slightly before the termination of the slot one side of the divided end of the plate is cut away, the cut being made on a slant, as shown. Of course, the plate could also be stamped if large quantities were being made, the object being to make the plate so that when the finger plate 28 is raised from the notch 29 said plate will be free to swing away and allow the platform to tilt or rock transversely upon the shaft 21.

As is obvious from the foregoing description when a weight is disposed upon the platform, such as a rodent or other small animal, at any point forward to the support 23 the same will lift the end of the shaft 21 on which the weight 22 is positioned sufficient to permit the finger 27 to free its plate 28 from the notch 29, whereupon the portion 26 of the platform will swing downwardly and expel the rodent or other animal into the inclosure afforded by the box 10 beneath the platform.

After the rodent or animal has been expelled into the box the platform will of course return to a horizontal position under the influence of the weight 25 and will regain sufficient momentum in such movement so that the plate 28 of the finger 27 will again be brought into the notch 29 and the trap again set. In this manner any number of rodents or other animals may be trapped without any attention being given to the trap.

The rodent or other animal to be trapped enters the inclosure afforded by the portion of the walls 12, 13 and 14 which project above the platform over the plate 16. A bait or other lure may be secured or suspended from the inner side of the wall 14 near the side wall 13. In order to insure that the rodent or animal will tread only upon the portion 26 of the platform the side wall 12 is extended by means of a supplemental wall 33. This wall is slanted and gradually increased in width toward the end wall 14 as shown in Figs. 1 and 3. The object of slanting the wall in question is to make the inclosure into which the rodent or animals proceeds appear as large as possible.

The platform 24 is of course the most stable near the shaft 21 and support 23. In order to lead the rodent or animal to be trapped over this portion of the platform when first entering there is provided a shield 34 which extends from the wall 13, as shown.

When one or more rodents or animals have been caught they may be taken from the box and destroyed through the door indicated at 35. The door in this instance is shown as located in the end wall 14 of the box, but of course it may be located at another point if found more suitable for the purpose intended. Also a poisonous gas might be introduced into the box and the rodents or animals killed in this manner if it is desired to destroy them.

It is believed from the foregoing description that a thorough understanding of the device together with its operation can be understood.

While I have shown the preferred form, construction, combination and arrangement of the different elements of the device it is to be understood that I am aware of the fact that these can be changed by anyone skilled in the art without departing from the spirit of my invention as indicated by the appended claims.

Having thus described my invention what I claim and desire to secure by Letters Patent is—

1. An animal trap comprising an inclosure; a runway across the top thereof; a hinged support for the runway along one side thereof and means tiltably supporting the runway at the entry end thereof whereby the weight of the animal upon the central portion of the trap will cause the runway to tilt, thereafter being released from its support to swing freely upon its hinge.

2. In a trap of the character described an inclosure, a platform tiltable longitudinally and transversely forming a top therefor and means associated therewith to hold the platform against tilting transversely until the same is tilted longitudinally.

3. In a trap of the character described an inclosure, a platform forming the top therefor, means for mounting said platform for transverse tilting movement, said means also being adapted to allow the platform to tilt longitudinally and means to hold the platform from tilting transversely until longitudinal tilting thereof has occurred.

4. In a trap of the character described an inclosure, a platform forming a cover therefor, pivotal supporting means for said platform positioned near one side, said means being adapted to allow the platform to tip forwardly or longitudinally, means for permitting transverse tilting of the table, a weight for holding the platform in a horizontal position and locking means for holding said platform against transverse tilting movement until forwardly or longitudinally tilted.

5. In a trap of the character described an inclosure, a platform forming a cover therefor, pivotal supporting means for said platform to permit the platform to tilt longitudinally or transversely, said supporting means being off center both longitudinally and transversely of the platform, counter-weights for holding the platform in a horizontal position and lock means adapted to hold the platform from tilting transversely until tilted longitudinally.

6. In a trap of the character described an inclosure, a platform forming a cover therefor, pivotal supporting means for said platform to permit the platform to tilt longitudinally or transversely, said supporting means being off center both longitudinally and transversely of the platform, counter-weights for holding the platform in a horizontal position and a finger depending from said platform engaging in a notch formed in a stationary member, said finger being adapted to be lifted from the notch when the platform is tilted longitudinally and thereby allowing the platform to tilt transversely.

7. In a trap of the character described an inclosure, a platform forming a top therefor, a pivotal support therefor adapted to permit transverse tilting movement of the platform and also adapted to permit longitudinal tilting movement of the platform in one direction, lock means by which the platform is held against transverse tilting movement, said means being adapted to be actuated by the longitudinal tilting movement of the platform to release the said platform and permit the transverse tilting thereof and an inclosing wall about the platform having an entrance opening and said wall being adapted to guide the animal to be trapped to the tilting end of the platform.

8. In a trap of the character described an inclosure, a platform forming a top therefor, a pivotal support therefor adapted to permit transverse tilting movement of the platform and also adapted to permit longitudinal tilting movement of the platform in one direction, lock means by which the platform is held against transverse tilting movement, said means being adapted to be actuated by the longitudinal tilting movement of the platform to release the said platform and permit the transverse tilting thereof and an inclosing wall about the platform having an entrance opening and said wall being adapted to guide the animal to be trapped to the tilting end of the platform, and a lure placed in close proximity to the last named end of the platform.

9. An animal trap including an inclosing housing; a platform forming the top thereof; a hinge means disposed beneath one side of the platform and by which the platform may be pivotably supported for longitudinal and transverse swinging movement; a counterweight by which the platform is normally held in a horizontal position; a finger depending from the platform; a stationary member with which the finger may be set in engagement and a second counterweight normally holding the platform against transverse movement and with the finger thereof in its set position whereby the presence of a weight on the opposite end of the platform from the entrance will cause the finger to become disengaged and will permit the platform to swing transversely.

HUGH C. McCURRIE.